(12) United States Patent
Betzler et al.

(10) Patent No.: US 8,140,978 B2
(45) Date of Patent: Mar. 20, 2012

(54) SYSTEM AND METHOD FOR PROVIDING INFORMATION IN A VIRTUAL WORLD

(75) Inventors: Boas Betzler, Magstadt (DE); Bernd Beyrodt, Stuttgart (DE); Dieter Buehler, Tuebingen (DE); Ansgar Schmidt, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 12/353,925

(22) Filed: Jan. 14, 2009

(65) Prior Publication Data

US 2010/0077313 A1 Mar. 25, 2010

(30) Foreign Application Priority Data

Jan. 16, 2008 (EP) .................................. 08150301

(51) Int. Cl.
 *G06F 3/00* (2006.01)
 *G06F 3/048* (2006.01)
(52) U.S. Cl. .................... 715/745; 715/764; 715/811
(58) Field of Classification Search .............. 715/745, 715/764, 811
 See application file for complete search history.

(56) References Cited

U.S. PATENT DOCUMENTS

| | | | | |
|---|---|---|---|---|
| 6,138,171 A * | 10/2000 | Walker | ........................... | 719/318 |
| 6,438,617 B1 * | 8/2002 | Savitzky et al. | ............... | 719/316 |
| 6,691,299 B1 * | 2/2004 | Hart et al. | ...................... | 717/108 |
| 6,694,346 B1 * | 2/2004 | Aman et al. | ................... | 718/104 |
| 2003/0020703 A1 * | 1/2003 | Holub | ............................ | 345/207 |
| 2005/0017977 A1 * | 1/2005 | Simpson et al. | .............. | 345/473 |
| 2006/0243415 A1 * | 11/2006 | Holub | ............................ | 164/130 |
| 2007/0204259 A1 * | 8/2007 | Wilner et al. | .................. | 717/124 |
| 2008/0022362 A1 * | 1/2008 | Hinton et al. | ...................... | 726/2 |
| 2008/0098453 A1 * | 4/2008 | Hinton et al. | ...................... | 726/1 |
| 2010/0077313 A1 * | 3/2010 | Draese et al. | ................. | 715/745 |

* cited by examiner

*Primary Examiner* — Weilun Lo
*Assistant Examiner* — Shashi Becker
(74) *Attorney, Agent, or Firm* — Kali Law Group, P.C.

(57) ABSTRACT

Providing tracking information about events in a virtual world using a computer is presented including: causing the computer to provide a re-usable code portion, the re-usable code portion configured with a unique identifier and an address of an external data storage, causing the computer to configure at least a set of events to be tracked for sending information about tracked events to the external data storage; causing the computer to associate the re-usable code portion with a virtual object to be tracked in the virtual world. In some embodiments, methods are presented wherein the causing the computer to associate the re-usable code portion with the virtual object comprises causing the computer to integrate the re-usable code portion on a source code level into the virtual object."

21 Claims, 4 Drawing Sheets

SYSTEM AND METHOD FOR PROVIDING INFORMATION IN A VIRTUAL WORLD

PRIORITY CLAIM TO FOREIGN APPLICATION

A claim for priority is hereby made under the provisions of 35 U.S.C. §119 for the present application based upon German Patent Application No. 08150301.3, filed on Jan. 16, 2008, which is incorporated herein by reference.

FIELD OF THE INVENTION

The invention relates to a system and method for providing information in a virtual world.

BACKGROUND OF THE INVENTION

Today, companies investing in virtual worlds (e.g. Second Life, Active Worlds, etc.) by building and designing virtual objects such as houses, cars, computers and the like, obtain little data on how their investment is perceived and used by virtual world members. The lack of this data effectively prevents such companies from improving their virtual world design based on empiric data which results in the investment potentially being spent in the wrong places.

It is known in the art to mitigate this problem by implementing simple counters at specific places within the companies' virtual world space to at least track the amount of avatars visiting the company area, thus capturing information triggered by static sensors.

In World Wide Web, tracking cookies are used for tracking which sites a user is visiting and how the user is interacting with the sites. A tracking cookie is a piece of information stored at the browser in the user's computer.

BRIEF SUMMARY

It is an object of the invention to provide a method and a system for providing information in a virtual world which is not restricted to a user's computer.

These objectives are achieved by the features of the independent claims. The other claims and the specification disclose advantageous embodiments of the invention.

A method is proposed for providing information about events in a virtual world, comprising:
  providing a re-usable code portion with a unique identifier and an address of an external data storage;
  configuring at least a set of events to be tracked for sending information about tracked events to the external data storage;
  associating the re-usable code portion with a virtual object to be tracked.

Favorably, it is possible to support virtual world wide data correlation and spatial tracking of objects moving or being moved in a virtual three dimensional (3D) world. The re-usable code Portion can provide communication with an outside web server using a virtual world HTTP interface function. A service processing the request stores the posted data in the centralized external storage device. Besides the possibility for local tools to operate and reason on the data stored in the storage device, the service can also support access to the aggregated data via e.g. HTTP request or other suitable protocols. Tracking and data collection can be implemented by simply using and/or attaching the re-usable code portion to a dedicated object in the virtual world. Custom data can be passed on for additional analysis external to the virtual world. It is possible to store the data on the external storage device and by this provide persistence beyond the persistence of the virtual world. The re-usable code portion is not restricted to spatial distances or other physical world limitations. Independent of its current location within the virtual world, the re-usable code portion is able to transmit its identification and custom data to the data repository, i.e. the data storage external to the virtual world. Favorably, these data are accessible even if the virtual world is not available. The aggregated data stored in the external data storage device can be analyzed by the owner of the re-usable code portion for usage information. Such operation is typically performed by tools that do further correlation of the data. An interesting aspect within virtual worlds is that captured 3D position data can be projected directly into the virtual world. As a result, a field of vision tracking can be directly projected into e.g. an exhibition hall as a set of 3D curves giving direct feedback on customer interests and options for improving the spatial arrangement of the presentation. Privacy matters can be addressed by restrictions on execution of certain scripts.

Favorably, the re-usable code portion can be associated with a first virtual object by integrating it on source code level into said first virtual object. The first virtual object can be e.g. a passage way in the virtual world thus tracking virtual world objects which are moving or which are moved through the passage way.

Alternatively or additionally, a dedicated virtual world object which contains the re-usable code portion can be attached to other objects that shall be tracked in the virtual world. The dedicated object can be e.g. a T-shirt, a sunglass or the like, which can be chosen and used by an avatar, i.e. a user in the virtual world, thus providing information about what dedicated object is chosen by the user, i.e. the tracked object, and/or which use is made of it by the user.

The re-usable code portion can favorably provide a first interface for collecting information about events relating to the tracked object. Particularly, the first interface provides at least one of
  a definition of events of which the virtual tracking object whishes to receive information from the tracked object;
  a receipt information from the tracked object.

Thus usage information can be made available. The re-usable code portion's first interface allows the object to which it is attached to pass on usage information, e.g. object was touched, the object was bought by, object user is . . . etc., which can be also stored in the database along with the identification information for later correlation and analysis. By default, the re-usable code portion can transmit location information periodically, which allows, for example, to gain insights how often a specific avatar is coming back to a specific place, e.g. a store or the like, and at which times. In particular, this allows e.g. to optimize the availability of store attendants.

The re-usable code portion can favorably provide a second interface for periodically collecting spatial information based on a configurable tracking frequency. Particularly, the spatial information can be e.g. a location and/or an orientation of the dedicated object thus revealing the location and/or the orientation for the tracked object.

The re-usable code portion can favorably provide a third interface for providing collected data to said external data storage. Particularly, the third interface can support http protocol. This allows easy data exchange with an appropriate http server.

According a preferred embodiment the re-usable code portion can provide tracking of individual pieces of information by at least one of
  tracking periodically;
  tracking on request;
  tracking as triggered.
}

Thus, for instance, the data can be collected if the dedicated object containing the re-usable code portion is picked up by an avatar.

Preferably, an identifier-generation algorithm can generate the unique identifier by concatenation of a unique identification of an executing avatar, a current virtual world time and a random integer number. Particularly, a wait state after generating the unique identifier can be implemented before a new unique identifier can be generated. By this approach, it is possible to avoid using the same identifier twice. Each re-usable code portion can get assigned its own globally unique identifier.

Favorably, the re-usable code portion can provide a definition of one or more conditions when information should be provided.

According to a preferred embodiment, an input of information from the external storage to the virtual world related to the tracked object can be performed. As a result, direct feedback can be provided on customer interests and options for improving the spatial arrangement of a presentation by directly projecting a field of vision tracking as a set of 3D curves into e.g. an exhibition hall.

According to another aspect of the invention, a system for performing a method for providing information about events in a virtual world is proposed, comprising a re-usable code portion with a unique identifier running on a virtual world; and an external data storage.

Favorably, the re-usable code portion can provide at least one of a first virtual object by integrating it on source code level of said first virtual object; e.g. Passage way attaching a dedicated virtual world object which contains the re-usable code portion to other objects that shall be tracked in the virtual world. By way of example, the dedicated object can be, e.g., a T-shirt, a sunglass.

The re-usable-code-portion-tracking system is preferably a system external to the virtual world which can be accessed even when the virtual world is down. Further, its existence is not tied to the existence of the virtual world, the virtual world may cease to exist but the data will still be available. It can also be easily integrated with other systems outside the virtual worlds for data analysis. In a preferred implementation, the tracking system offers a HTTP based remote API that can be accessed from within the virtual world to push captured data to the tracking system.

Preferably, the re-usable code portion can provide at least one of a first interface for collecting information about events relating to the tracked object; a second interface for periodically collecting spatial information based on a configurable tracking frequency; a third interface for providing collected data to the external data storage.

The external storage can be coupled to a tracking system, the tracking system comprising a server and a tracking data analyzer system.

The tracking data analyzer system can comprise a code-portion-tracking servlet and a tracking data handler. The servlet can receive the data from the virtual world and detect the data in an e.g. http request portion. The data handler can unpack the data collected by the re-usable code portion and store it in the tracking data storage device.

Favorably, the tracking data analyzer system can comprise a code-portion-tracking monitor.

A data transmission helper running on the virtual world can be assigned to the re-usable code portion. The transmission helper can provide a unique identification (identifier), such as the server address, a URL or the like, of the virtual world to the tracking system in the real world.

A tracking data visualizer running on the virtual world can be assigned to the re-usable code portion. As a result, a direct feedback can be provided on customer interests and options for improving the spatial arrangement of a presentation in the virtual world by directly projecting a field of vision tracking as a set of 3D curves into e.g. an exhibition hall.

Sharing of information by the tracking system can be customized both by the issuer of the re-usable code portion as well as by the owner of the object the re-usable code portion is attached to. For this purpose, an external browser unit can be coupled to the tracking system. For example, the frequency of the transmission of location change of the object can be configured when the re-usable code portion is issued. Also, the creator of an object with an attached re-usable code portion can allow the owner of the object to disable certain transmissions.

In embodiments, methods for providing tracking information about events in a virtual world using a computer are presented including: causing the computer to provide a re-usable code portion, the re-usable code portion configured with a unique identifier and an address of an external data storage; causing the computer to configure at least a set of events to be tracked for sending information about tracked events to the external data storage; causing the computer to associate the re-usable code portion with a virtual object to be tracked in the virtual world. In some embodiments, methods are presented wherein the causing the computer to associate the re-usable code portion with the virtual object comprises causing the computer to integrate the re-usable code portion on a source code level into the virtual object. In some embodiments, methods are presented wherein the causing the computer to associate the re-usable code portion with the virtual object comprises causing the computer to attach the re-usable code portion to the virtual object. In some embodiments, methods further include: causing the computer to retrieve a portion of the information from the external data storage; and causing the computer to project the information into to the virtual world related to the virtual object. In other embodiments, systems for providing information about events in a virtual world are presented including: a virtual object configured for operating within the virtual world; a re-usable code portion having a unique identifier, the re-usable code portion configured for tracking the events corresponding with the virtual object, wherein the tracking corresponds with the information; and an external data storage for receiving the information. In some embodiments, systems are presented wherein the re-usable code portion is associated with the virtual object in a manner such as: integrating the re-usable code portion at a source code level with the virtual object, and attaching the re-usable code portion with virtual object. In other embodiments, computer program products for providing tracking information about events in a virtual world, the computer program are presented including: first programmatic instructions for providing a re-usable code portion, the re-usable code portion configured with a unique identifier and an address of an external data storage; second programmatic instructions for configuring at least a set of events to be tracked for sending information about tracked events to the external data storage; third programmatic instructions for associating the re-usable code portion with a virtual object to be tracked in the virtual world.

BRIEF DESCRIPTION OF THE SEVERAL
VIEWS OF THE DRAWINGS

The present invention together with the above-mentioned and other objects and advantages may best be understood from the following detailed description of the embodiments, but not restricted to the embodiments, wherein is shown in.

The drawings are merely schematic representations, not intended to portray specific parameters of the invention. The drawings are intended to depict only typical embodiments of the invention and therefore should not be considered as limiting the scope of the invention.

DETAILED DESCRIPTION

In the drawings, like elements are referred to with equal reference numerals.

Figure 1:
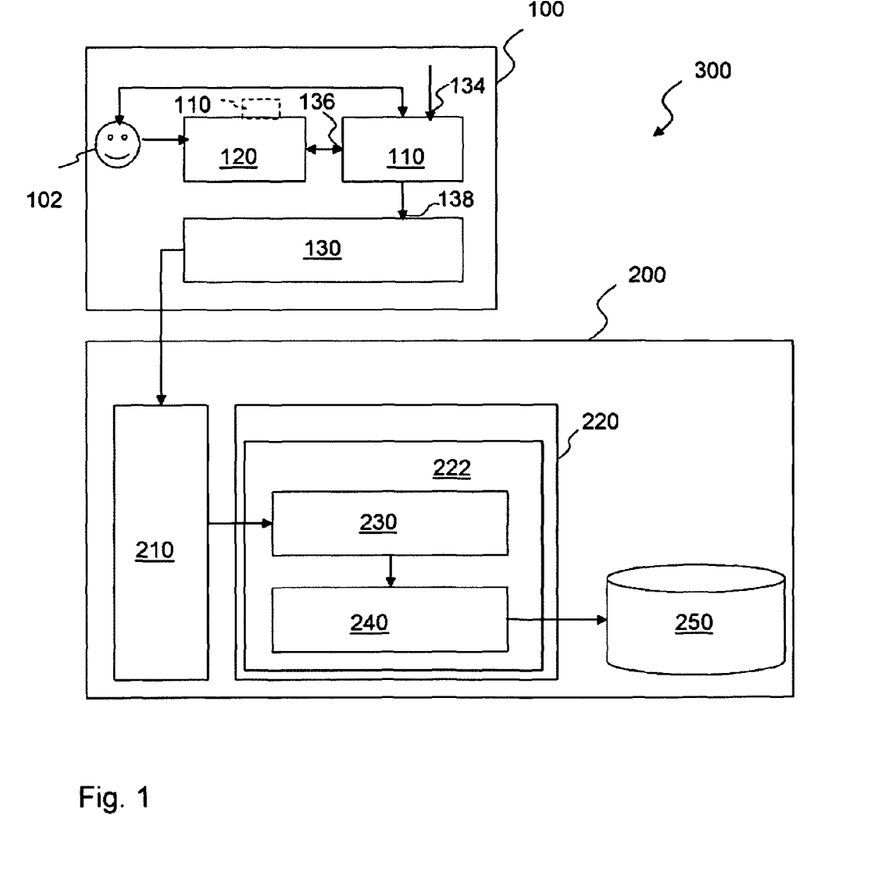
FIG. 1—a preferred embodiment of a virtual world object tracking system.

FIG. 1 depicts a high level architecture of a preferred virtual world object tracking system 300 according to the invention. A virtual world 100 such as Second Life® (provided by Linden Labs) or the like is coupled to the real world 200. The tracking system 300 introduces a re-usable code portion 110 component that is implemented as an object 120 in the virtual world 100. With the re-usable code portion 110 being a virtual world object 120, an avatar 102, i.e. user operating in the virtual world 100, can interact with the re-usable code portion 110 like the user 102 can with any other object in the virtual world 100, i.e. the user 102 can clone it, carry it along, and attach it to other objects, and, as long as the user 102 is authorized to do this, adjust its configuration.

The preferred method for providing information about events in a virtual world 100, comprises the steps of providing the re-usable code portion 110 with a unique identifier and an address of an external data storage 250, configuring at least a set of events to be tracked for sending information about tracked events to the external data storage 250 and associating the re-usable code portion 110 with a virtual object 120 to be tracked.

The re-usable code portion 110 can be associated with the virtual object 120 by integrating it on source code level into the first virtual object 120. As an example, the virtual object 120 can be a passage way in the virtual world 100 which then can register avatars 102 passing by this passage way.

Alternatively, the re-usable code portion 110 can be associated with the virtual object 120 by attaching a dedicated virtual world object 110a (indicated by dashed lines) which contains the re-usable code portion 110 to other objects 120 that shall be tracked in the virtual world 100. The dedicated virtual object 110a can be, e.g. a T-shirt, a pair of sunglasses and the like, and the object 120 to be tracked can be the avatar 102 itself carrying the dedicated virtual object 110a with him, for example.

The re-usable code portion 110 communicates with an outside web server 210 in the real world 200 using, for instance, a virtual world HTTP interface function. The invocation carries a unique identifier of the re-usable code portion's 110 and the captured tracking data. The service processing the request stores the posted data in a centralized tracking data repository, i.e. data storage device 250. Besides the possibility for local tools to operate and reason on the data stored in the storage device 250, the service also supports remote access to the aggregated data via HTTP request.

This approach allows the data to be analyzed outside the virtual world 100 and independent of the virtual world 100 either by tools running local on an application server 220 coupled to the central data storage 250 or by tools that aggregate remote data potentially originating from multiple repositories (e.g. data storage device 250). The application server 220 comprises a tracking subsystem 222 with an integrated tracking servlet 230 and a tracking data handler unit 240. The servlet 230 receives and finds data in the request from the server 210 and the handler unit 240 unpacks the data and stores them into the storage device 250.

As a further option, the aggregated data can be fed back into the virtual world 100, e.g. to render spatial tracking data as 3D artifacts within the virtual world 100.

The re-usable code portion 100 can submit its data on specific events, e.g. timer events or events related to the object 120 it is attached to. The re-usable code portion 110 provides a customization interface 134 allowing an external user to specify to which event the VW re-usable code portion should respond. If after the re-usable code portion 110 has been customized it is copied, it retains its customization and hence allows mass-creation of specific purpose-customized re-usable code portion 110. The only difference between the re-usable code portions 110 are their identifiers which are unique are created when a new re-usable code portion 110 is created and/or instantiated.

The customization interface 134 is dedicated for collecting information about events relating to the tracked object 120 and can particularly provide a definition of events of which the dedicated virtual tracking object 110a whishes to receive information from the tracked object 120 and a receipt information from the tracked object 120.

The re-usable code portion 110 provides a second interface 136 for periodically collecting spatial information based on a configurable tracking frequency. The spatial information can be location and/or orientation of the tracked object 120.

Further, the re-usable code portion 110 provides a third interface 138 for providing collected data to said external data storage 250. By way of example, the third interface 138 can support HTTP protocol for communication with a server 210 being coupled to the application server 220.

The application server 220 receives a unique identifier, e.g. a server address, of the virtual world 100 by way of a data transmission helper unit 130 being coupled to the server 210 in the real world.

Preferably, the re-usable code portion 110 has direct access to its actual location (i.e. 3D coordinates) within the virtual world 100. This makes it easy for the re-usable code portion 110 to track even complex relocations. Even subtle changes in object orientation can be captured by using a re-usable code portion 110 that is attached in relation to the spatial orientation of the tracked object 120. This allows for example to create virtual sunglasses instrumented with a re-usable code portion 110 tracking the filed of vision of customer avatars 102 within an exhibition hall. Such data is of tremendous value for companies trying to optimize the presentation of their merchandise.

Figure 2:
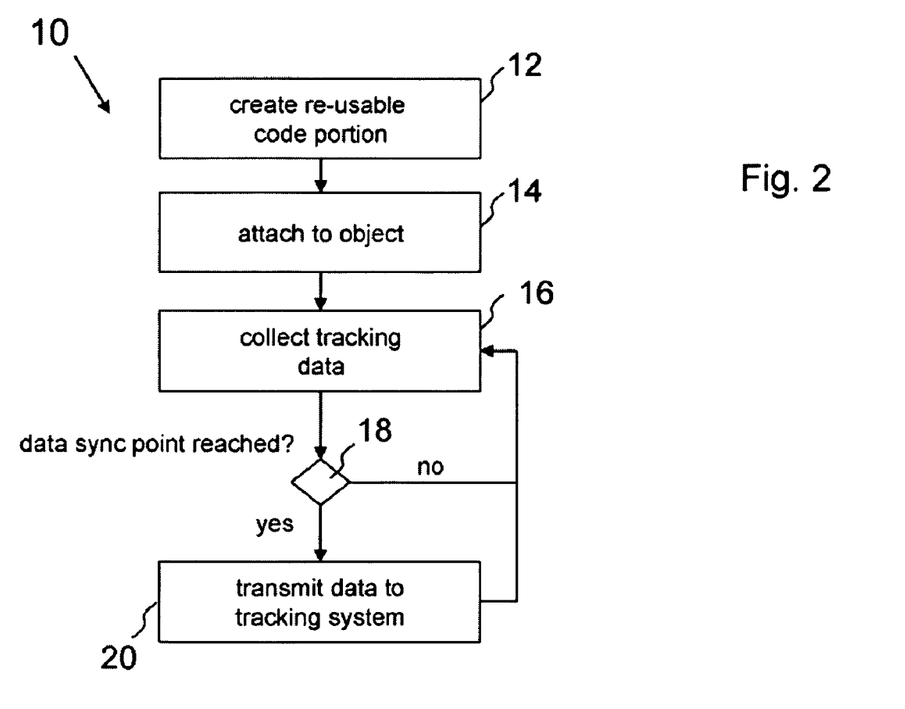
FIG. 2—a life cycle of a preferred re-usable code portion in a virtual world.

The life cycle of an individual re-usable code portion is depicted in FIG. 2 in a flow chart 10 making reference to the elements described in FIG. 1. In step 12 a re-usable code portion 110 is created, in step 14 the re-usable code portion 110 is attached to the object 120 to be tracked and tracking data are collected in step 16. In step 18 it is checked whether a data synchronization point is reached of yes, the data are transmitted to the tracking system in step 20. If no, data collection is continued in step 16. Step 20 can also request for continued data collection in step 16.

Re-usable code portions 110 can be created in the virtual world 100 through cloning an initial re-usable code portion 110. The new re-usable code portion 110 instance contains all properties and object logic of the initial one (including a tracking logic of the original re-usable code portion 110) but it can tweak its internal data during its 'creation' event. In this event, the re-usable code portion 110 will compute its internal unique identifier that will allow actually correlating all data collected by this re-usable code portion 110. The identifier-generation algorithm generates the re-usable code portion identifier by concatenating the following values:

a unique identifier of the executing avatar 102
a current virtual world time in milliseconds
a random integer value.

After generating the identifier, the algorithm can implement a wait state that lasts for 1 millisecond. By this approach, the re-usable code portion identifier-generation algorithm guarantees that the same identifier is never generated twice and each re-usable code portion 110 gets assigned its own globally unique identifier.

In addition to this the re-usable code portion 110 contains internal properties that control its behavior. The corresponding property values are just copied by default from the initial object 110a, but they can be modified by authorized users in order to adjust the tag behavior. The supported properties are preferably:

a Boolean flag indicating whether data tracking is activated or deactivated;
a server address of the virtual object tracking system (i.e. a URL of a re-usable code portion servlet);
a location record tracking frequency;
a data transmit frequency;
a list of events to be tracked.

Figure 3:
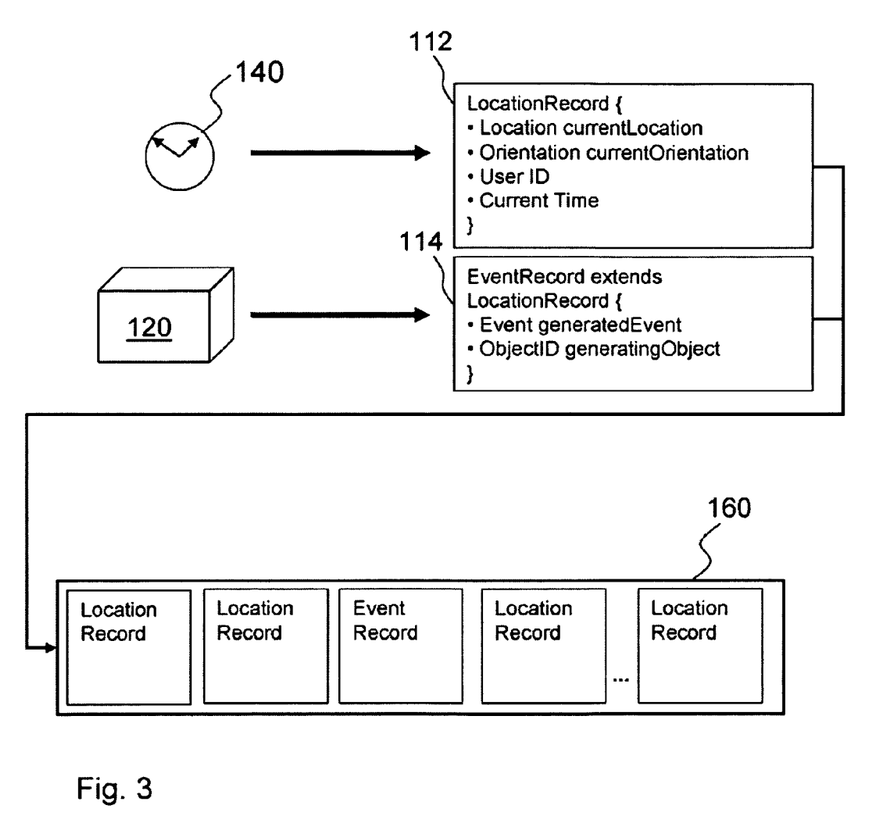
FIG. 3—data tracking within a preferred re-usable code portion.

After being created, the re-usable code portion 110 starts collecting actual tracking data as long as the re-usable code portion's enabled flag is set to true. As depicted in FIG. 3, the re-usable code portion 110 captures two kinds of data records: Location Records 112 and Event Records 114. The Location Record 112 comprises parameters, particularly a string name for the re-usable code portion 110, a current location (currentLocation) of the tracked object 120, a current orientation (currentOrientation) of the tracked object 120 in the virtual world 100, a user identification related to the avatar 102, and a current time in the virtual world 100 of a timer 140. The Event Record 114 extends the Location Record 112 by additionally furnishing an event (generatedEvent) and an object identification (generatedObject).

The location records 112 can be repeatedly collected according to a fixed time interval based on the location record tracking frequency mentioned earlier. In addition to that, event records can be generated for specific events. In order to achieve that, the re-usable code portion 110 registers itself as a listener to those events at the object 120 the re-usable code portion 110 or the dedicated object 110a, respectively, is attached to. As a result, the object 120 will notify the re-usable code portion 110 on each occurrence of such events. The re-usable code portion 110 in turn will then generate a corresponding EventRecord entry. As mentioned earlier the re-usable code portion 110 contains a configurable list of events that shall be tracked (i.e. result in EventRecords) all other events will be just ignored. Events of interest may include:

the object 120 laid down at a specific location X;
the object 120 given to a user with user identification Y;
the object 120 modified;
the object 120 destroyed;
the object 120 put in inventory;
the object 120 being looked at;
the object 120 sold;
the object 120 worn;
the object 120 put off.

All location and event records 112, 114 are written into a tracking record data object 160. At each time a Location-Record 112 is captured the re-usable code portion 110 checks if a data synchronization point has been reached (step 18 in FIG. 2). The result of this check depends on the data transmission frequency configured within the given re-usable code portion 110. If a data synchronization point has been reached, the tracking record 160 is transmitted to the external tracking system 210, 220, 250 and a new tracking record data object 160 is created to capture the upcoming data records.

For example, if the data transmit frequency is configured to track 0.1 data records per second and the data transmission frequency is configured to transmit 0.001 tracking records per second to the tracking system, than each tracking record will contain 100 location records 112 plus eventually some event records 114.

The actual transmission of the tracking record to tracking system is implemented by a data-transmission-helper-unit-script component. This script (which can be stored directly in the tracked object 120 or the re-usable code portion 110 or be attached to it) facilitates the projection of tracking data collected by the re-usable code portion 110 to the virtual world object tracking system 222 (FIG. 1). This transmission crosses the border between the virtual world 100 and the real world 200 where the virtual world object tracking system manages 222 its data.

The actual transmission utilizes, for instance, a HTTP support available in the Second Life virtual world 110. Other virtual worlds may provide other means to communicate with the outside world 200. The tracking record 160 is transferred to the tracking servlet 230 of the tracking system 222 by doing a corresponding HTTP POST request to the URL retrieved from the re-usable code portion's 110 internal configuration data. The tracking servlet 230 is implemented e.g. as a J2EE servlet running on the corresponding J2EE application server 220 (e.g. WebSphere Application Server®) adhering to the Representation State Transfer (REST) Pattern. This implementation allows for superior caching, load balancing and high availability characteristics of the service.

Figure 4:
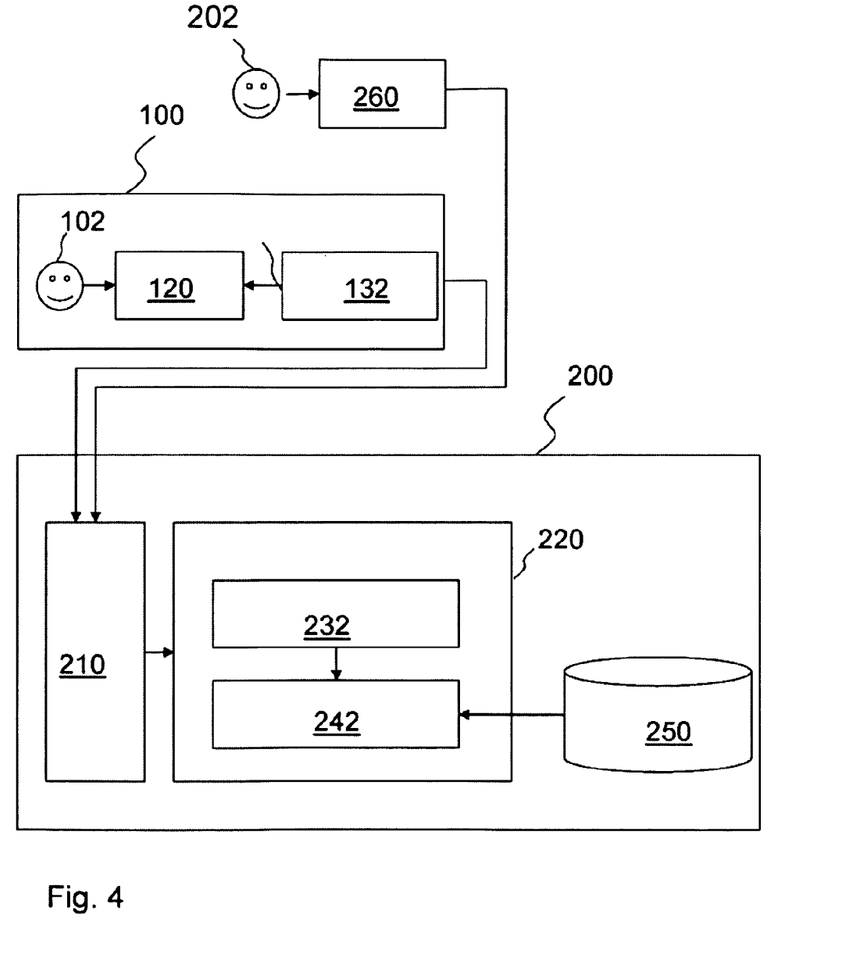
FIG. 4—a preferred embodiment of a virtual world object data analysis.

The servlet 230 in turn passes the individual tracking records 160 to the tracking data handler unit 240 (FIG. 1) which extracts the individual data records 160 again and transforms those into a relational data model such that it can be stored into a relational database like IBM DB2® in the data storage device 250. Based on this model, further database view can be defined that allow aggregated and precompiled views on the tracking data that can be visualized by a tracking Monitor component, as shown in FIG. 4.

The tracking monitor 232 is another servlet that displays the aggregated information in meaningful way to the system analysts 202 who access the monitor 232 using a web browser 260. The views exposed by the monitor 232 would include dedicated views for EventRecord data like:

How many users looked at objects associated to the re-usable code portion 110 named X?
How many users took one of those in hands?
How long did they keep it?
To whom did they give it? Or did they just drop it? If yes where?
How many users that looked at the objects associated to the re-usable code portion 110 named X did also look at objects associated to the re-usable code portion 110 named Y?

3D visualizations of the LocationRecord data are also possible that allows to track the special routes that individual objects took in the virtual world 100 (e.g. the route the virtual shopping carts took through a virtual mall).

As depicted in FIG. 4 the location tracking data can also be used to project this data back into the virtual world 100 to directly visualize the 3D data in the virtual world 100 itself by a tracking data visualizer 132 implemented in the virtual world 100. For instance, the routes of the shopping carts in the mall could be visualized as thicker or thinner lines on the mall floor depending on how many carts have been traversing a specific hall way. In this scenario, the system analysts 202 do not use a web browser 260 to analyze the data, but they log into the virtual world 100, enter the mall and directly see the sweet spots and the weak points rendered directly within their part of the virtual world 100.

To achieve this, the tracking data visualizer script component in the virtual world 100 retrieves the corresponding aggregated 3D data from the tracking monitor servlet 232 via a corresponding HTTP GET request. Depending on the retrieved data the visualizer 132 adjusts the visual appearance of the object containing the script component to actually visualize the data (e.g. change the texture of the object).

To accommodate such requests, the tracking monitor servlet 232 exposes a corresponding REST service (REST=Representational State Transfer) to allow the tracking data visualizer 132 to retrieve aggregated data relevant for the specific object doing the request. This approach shields the individual visualizer objects from having to implement complex aggregation logic and allows to keep them simple such that basically any object can be turned into a tracking data visualizer 132 very easily.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A preferred data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O-devices (including, but not limited to keyboards, displays, pointing devices, etc.) can be coupled to the system either directly of through intervening I/O controllers.

Network adapters may also be coupled to the system to enable the data processing system or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A system for providing information about events in a virtual world comprising:
a virtual object configured for operating within the virtual world;
a re-usable code portion having a unique identifier, the re-usable code portion configured for tracking the events corresponding with the virtual object, wherein the tracking corresponds with the information; and wherein the re-usable code portion is associated with a virtual object to be tracked in the virtual world either by attaching the re-usable code portion to the virtual object or by attaching the re-usable code portion to the virtual object;
an external data storage for receiving the information.

2. The system of claim 1, wherein the re-usable code portion is associated with the virtual object in a manner selected from the group consisting of: integrating the re-usable code portion at a source code level with the virtual object, and attaching the re-usable code portion with virtual object.

3. The system of claim 2, wherein the re-usable code portion comprises:
first interface for collecting usage information about events relating to the virtual object;
a second interface for periodically collecting spatial information based on a configurable tracking frequency; and
a third interface for providing the information to the external data storage, wherein the information includes usage information and spatial information.

4. The system of one of the claim 1, wherein the external storage is coupled with a tracking system, the tracking system comprising a server and a tracking subsystem.

5. The system of claim 4, wherein the tracking subsystem comprises an integrated tracking servlet for finding the information in a request from the server and a tracking data handler for unpacking the information and storing the information into the external data storage.

6. The system of claim 4, wherein the tracking subsystem comprises a tracking monitor for aggregating the information.

7. The system of claim 4, wherein the re-usable code portion is further configured for providing the unique identifier to the tracking subsystem.

8. The system of claim 1, further comprising a tracking data visualizer for projecting the information back into the virtual world.

9. The system of claim 1, further comprising an external browser unit coupled with the tracking system for accessing the information.

10. A computer program product for providing tracking information about events in a virtual world, the computer program comprising:

first programmatic instructions for providing a re-usable code portion, the re-usable code portion configured with a unique identifier and an address of an external data storage;

second programmatic instructions for configuring at least a set of events to be tracked for sending information about tracked events to the external data storage;

third programmatic instructions for associating the re-usable code portion with a virtual object to be tracked in the virtual world wherein the third programmatic instructions for associating the re-usable code portion with the virtual object comprise either fourth programmatic instructions for causing the computer to attach the re-usable code portion to the virtual object or fifth programmatic instructions for causing the computer to attach the reusable code portion to the virtual object.

11. A method for providing tracking information about events in a virtual world using a computer comprising:

causing the computer to provide a re-usable code portion, the re-usable code portion configured with a unique identifier and an address of an external data storage;

causing the computer to configure at least a set of events to be tracked for sending information about tracked events to the external data storage;

causing the computer to associate the re-usable code portion with a virtual object to be tracked in the virtual world wherein the causing the computer to associate the re-usable code portion with the virtual object comprises either causing the computer to attach the re-usable code portion to the virtual object.

12. The method of claim 11, wherein the re-usable code portion is further configured with a first interface for causing the computer to collect usage information about events relating to the virtual object.

13. The method of claim 12, wherein the first interface is configured for causing the computer to collect usage information selected from the group consisting of: a definition of events information from the virtual object and a receipt information from the virtual object.

14. The method of claim 13, wherein the re-usable code portion is further configured with a second interface for periodically causing the computer to collect spatial information based on a configurable tracking frequency.

15. The method of claim 14, wherein the re-usable code portion is further configured with a third interface for causing the computer to provide the information to the external data storage, wherein the information includes usage information and spatial information.

16. The method of claim 15, wherein the third interface supports an http protocol.

17. The method of claim 11, wherein the re-usable code portion is configured for causing the computer to track the information in a manner selected from the group consisting of: tracking periodically, tracking on request, and tracking as triggered.

18. The method of claim 11, wherein the unique identifier is generated by an identifier-generation algorithm, wherein the identifier-generation algorithm utilizes a concatenation of a unique identification of an executing avatar, a current virtual world time, and a random integer number in generating the unique identifier.

19. The method of claim 18, wherein the identifier-generation algorithm further causing the computer to implement a wait state after generating the unique identifier before a new unique identifier can be generated.

20. The method of claim 11, wherein the re-usable code portion is further configured to provide a definition of at least one condition corresponding with when information should be provided to the external data storage.

21. The method of claim 11, further comprising:

causing the computer to retrieve a portion of the information from the external data storage; and causing the computer to project the information into to the virtual world related to the virtual object.

* * * * *